US005539653A

United States Patent [19]

Pomatto

[11] Patent Number: 5,539,653

[45] Date of Patent: Jul. 23, 1996

[54] METHOD AND APPARATUS FOR REASSIGNING LOST CAPACITORS IN A POWER DISTRIBUTION NETWORK

[75] Inventor: Lawrence A. Pomatto, Santa Ana, Calif.

[73] Assignee: Systems Analysis and Integration, Inc., Orange, Calif.

[21] Appl. No.: 208,648

[22] Filed: Mar. 9, 1994

[51] Int. Cl.[6] ................................ G05F 5/00; H02J 13/00

[52] U.S. Cl. ........................... 364/492; 323/209; 364/140

[58] Field of Search ............................... 307/31; 323/209, 323/210, 211; 364/140, 141, 148, 152, 492, 493

[56] References Cited

U.S. PATENT DOCUMENTS

| | | | |
|---|---|---|---|
| 3,002,146 | 9/1961 | Lorrig et al. | 323/209 |
| 3,002,147 | 9/1961 | Wasserman | 323/209 |
| 4,769,587 | 9/1988 | Pettigrew | 323/209 |
| 4,771,225 | 9/1988 | Nishikawa | 323/211 |
| 5,422,561 | 6/1995 | Williams et al. | 323/209 |

*Primary Examiner*—Edward R. Cosimano

*Attorney, Agent, or Firm*—Knobbe, Martens, Olson & Bear

[57] ABSTRACT

The present invention provides method and apparatus for reassigning switched capacitors which are lost as a result of circuit reconfiguration. A power distribution network includes a plurality of substations. Each substation includes a master controller which manages switching operations of a plurality of load regulation capacitors. The capacitors which are a part of the same circuit as a given master controller are normally under the control of that master controller. Each time a load regulation capacitor is connected or disconnected, a change in the voltage level and the VARs level is observed on the distribution line to which the capacitor was connected. When a load regulation capacitor is reconfigured so that it no longer is a part of a distribution line controlled by its associated master controller, the master controller connects or disconnects the capacitor and polls the neighboring master controllers to determine which of the neighboring controllers has observed a significant change in the VARs or voltage level on their associated distribution lines at the time of connection or disconnection. The capacitor is then reassigned to the control of the neighboring controller which observed a significant change in the state of its associated distribution line.

5 Claims, 5 Drawing Sheets

METHOD AND APPARATUS FOR REASSIGNING LOST CAPACITORS IN A POWER DISTRIBUTION NETWORK

BACKGROUND OF THE INVENTION

1. Field of the Invention

The present invention relates to power distribution networks that use capacitance to compensate for inductive loads on the power distribution lines.

2. Description of the Related Art

Power distribution networks are used to distribute power to a plurality of residential or commercial customers. Typically, such networks involve voltage waveforms which are phase-shifted by approximately 120 degrees to establish three voltage phases (i.e., the A phase, the B phase, and the C phase). For a more detailed description of such power distribution systems, see U.S. application Ser. No. 08/012,280, entitled "Substation Load Distribution Monitor System," filed Feb. 1, 1993, now U.S. Pat. No. 5,406,495. Among the problems observed in typical power distribution networks, one prevalent problem is the inefficiency of power distribution caused by inductive loads on the distribution lines.

In order to compensate for inefficiencies due to inductive loads on the power distribution lines, a number of switched capacitors are utilized within the power distribution system. As is well known in the art, capacitance compensates for phase shift, reduced voltage and other undesirable effects of inductive loads. Thus, electric utility companies typically utilize capacitors to improve the efficiency of their electrical distribution systems. Capacitors utilized by electric utility companies may be permanently active (that is, permanently connected to a power distribution line) or may be switched on- and off-line by some control or command operated device. Permanently active capacitors are typically called "fixed capacitors," while controllable capacitors are typically called "switched capacitors."

In typical power distribution systems, a number of power distribution lines branch from the main system via substations. One or more switched capacitors may be configured to connect or disconnect from a given power distribution line associated with a particular substation.

Commonly, distribution lines within an electrical distribution system are reconfigured constantly in order to meet power requirements on any given day. Thus, a particular switched capacitor can be part of a distribution line under the control of one substation on one day, and part of another distribution line under the control of the same or another substation on another day. Capacitor reconfiguration is often performed by an in-field technician, who does not record that a capacitor within a substation control group has been reconfigured. Capacitors which are reconfigured without notification to the appropriate substation controllers are called "lost capacitors." These lost capacitors may be assigned to one distribution line of one substation while actually being configured into another distribution line of the same or another substation. Thus, when the capacitor is switched, it affects the wrong distribution line.

In addition to the above-mentioned limitations, since a lost capacitor causes no change in the state of the distribution line connected to the substation to which the lost capacitor is assigned (i.e., because it is no longer a part of the assigned distribution line), it is difficult to determine if the capacitor is defective, or has simply been reconfigured.

Thus, it is important to determine the electrical location of reconfigured capacitors in order to properly regulate loads in a power distribution network.

SUMMARY OF THE INVENTION

The present invention relates to a method and apparatus for identifying lost capacitors and determining whether or not the lost capacitors are defective. In General, capacitors in a power distribution network are controlled with automated capacitor controllers which communicate with substation master controllers. In sequence, a first substation master controller activates capacitors which are assigned to distribution lines under control of the first master controller.

If activation of the capacitor causes a change in the power characteristics of the assigned distribution line, as detected by the assigned master controller, the capacitor is properly assigned. If activation of the capacitor causes a change on a different distribution line under control of the first master controller, the first master controller simply records the new configuration. If activation of a capacitor does not cause a change in power characteristics for the associated distribution line, or for any other distribution line under control of the first master controller, the identity of that capacitor is recorded on a test list for further testing. The first master controller then polls neighboring master controllers to determine if any neighboring master controllers detected a change on any distribution line at the time of activation of each capacitor on the test list. If a neighboring master controller detects a change on one of its distribution lines at the time of activation of a capacitor on the test list, control of this capacitor is reassigned to the master controller that detected a change.

If no neighboring master controllers detect a change at the time any particular capacitor on the test list was activated, then any such capacitor is recorded as defective (i.e., defective or not connected to any distribution line in the power distribution network).

Each neighboring master controller then executes a similar testing sequence for capacitors assigned to the respective neighboring master controllers.

One aspect of the present invention involves a method of reassigning control of load regulation capacitors within a power distribution network. The method involves a number of steps. A control list is first generated of load regulation capacitors which are associated with, and under the control of, a first master controller for a first power distribution subsystem in the power distribution network. The control list identifies at least one capacitor. Next, the connection status of the accessed capacitor is changed, and the state of a distribution line within the first power distribution subsystem is monitored for a change in the state of the power line when the connection status of the capacitor is changed. If the change in the connection status of the capacitor does not produce a change in the state of the distribution line, an indication of this is made. These steps are repeated for each capacitor on the control list, and each capacitor which was associated with an indication of no change in the state of the distribution line is removed from the control list for the first master controller.

In one embodiment, a further determination is made as to which of a plurality of other power distribution subsystems the capacitors removed from the control list are associated with. Control of the indicated capacitors is reassigned from the first master controller to at least one second master controller for the identified other power distribution subsystem.

Another aspect of the present invention involves a system for managing the control of load regulation capacitors in a power distribution system. The system has a plurality of power distribution subsystems. Each subsystem has a master controller, and a plurality of subsystem power distribution lines under control of the master controller. The master controller is configured to monitor the power distribution lines.

Each of a plurality of switched capacitors is connectable to one of the plurality of power distribution lines for one of the distribution subsystems. The capacitors are controllable by a master controller within one or more of the power distribution subsystems via one or more communication links. A means for monitoring is coupled to a first at least one of the plurality of power distribution lines in order to monitor for a predetermined change in the state of the first at least one power distribution line upon a change of connection status of one of the switched capacitors.

An indicator is responsive to the lack of a change in the state of the first at least one power distribution line when the connection status of the switched capacitor is changed, and a control unit responds to the indicator to further identify when a second one of the master controllers detected a change in the state of a second at least one of the plurality of power distribution lines.

DETAILED DESCRIPTION OF THE INVENTION

Figure 1:
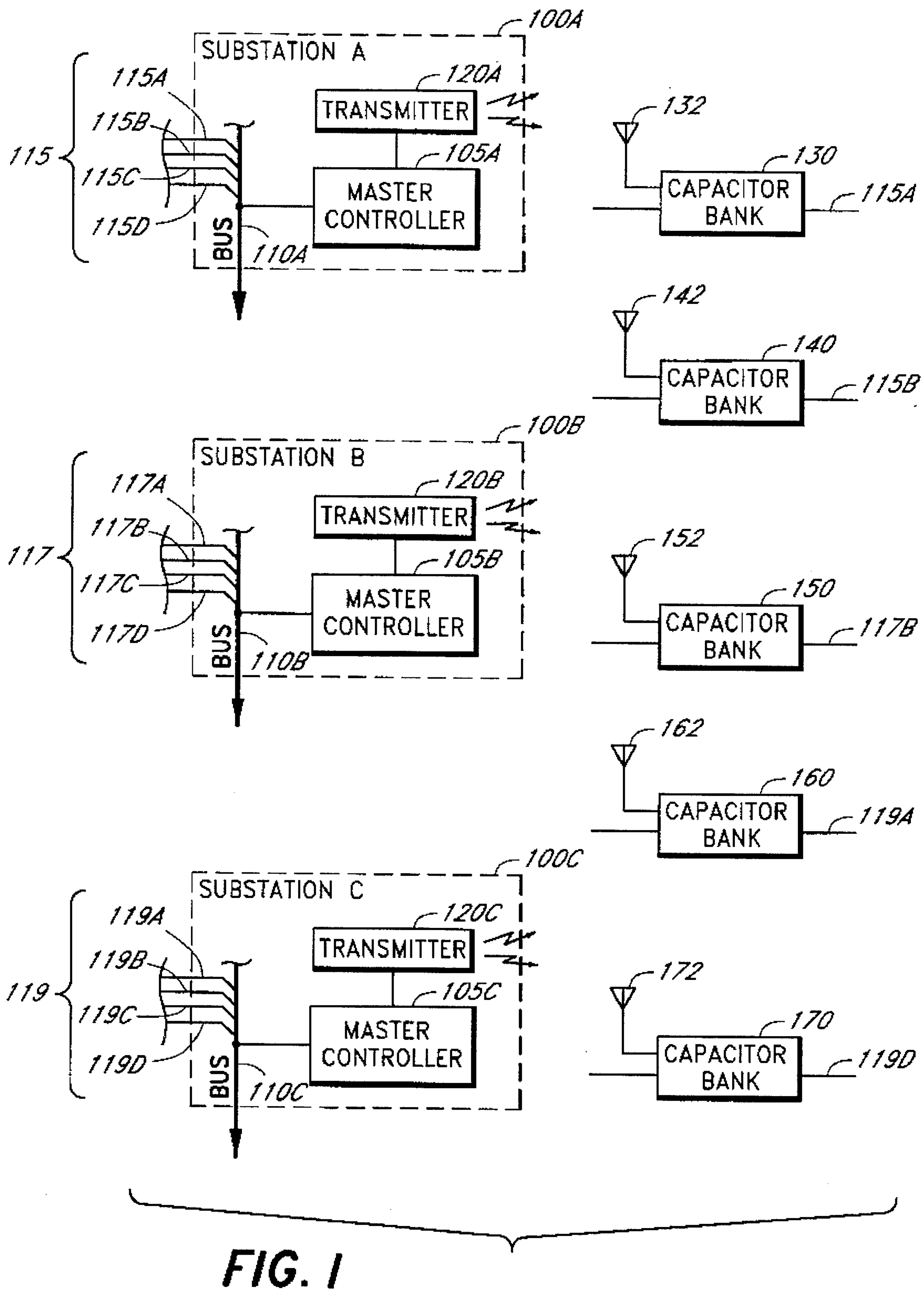
FIG. 1 is a block diagram which shows the main structural components of a plurality of power distribution substations in addition to a number of remotely controlled banks of switched capacitors.

FIG. 1 is a block diagram showing a number of power distribution substations 100A, 100B, 100C. Each substation (i.e., Substations A,B, and C) includes a master controller 105A, 105B, 105C which monitors the voltage of the substation power bus 110A, 110B, 110C. Preferably, the master controllers 105A, 105B, 105C also monitor their associated power distribution lines 115, 117, 119. Each master controller 105A–105C typically includes a central processing unit (e.g., an Intel 80286), a read-only memory (ROM), an analog-to-digital converter, serial and parallel interfaces, and a digital interface. Each of the internal components of the master controllers are shown and described in detail in U.S. patent application Ser. No. 08/012,280 entitled "Substation Load Distribution Monitor System," filed Feb. 1, 1993, now U.S. Pat. No. 5,406,495 which is incorporated herein by reference.

One or more power distribution lines 115, 117, 119 are coupled to the each substation bus 110. For instance, as depicted in FIG. 1, a number of Substation A power distribution lines 115A, 115B, 115C, 115D branch from the Substation A substation bus 110A. A number of Substation B power distribution lines 117A, 117B, 117C, 117D branch from the Substation B substation bus 110B. Similarly, a number of Substation C power distribution lines 119A, 119B, 119C, 119D branch from the Substation C substation bus 110C. The power distribution lines 115, 117, 119 typically distribute power to residential or commercial customers. The master controllers 105A–105C are in communication with a plurality of capacitor banks 130, 140, 150, 160 and 170. In the present embodiment, communication between the capacitor banks 130, 140, 150, 160, 170 and the master controllers 105A–105C is carried out with a radio communication link, as depicted in FIG. 1. However, a number of communication links (e.g., a LAN, telephone lines, etc.) may be used to transmit control signals from the master controllers 105A–105C to each of the capacitor banks 130–170. In the embodiment shown in FIG. 1, each master controller 105A, 105B, 105C connects to a respective transmitter 120A, 120B, 120C. The transmitters 120A–120C are configured to transmit control signals to capacitor controllers (not specifically shown in FIG. 1) for the capacitor banks 130, 140, 150, 160, 170. The capacitor controllers have respective antennas 132, 142, 152, 162, 172.

Although each of the capacitor banks 130–170 is potentially controllable by any of the master controllers 105A–105C, only capacitor banks 130–170 that are connected in the distribution line of the substation bus 110 for a selected master controller 105 should receive commands from that selected master controller. Thus, as shown in FIG. 1, the first and second capacitor banks 130, 140 should be assigned to and receive commands from the Substation A master controller 105A because the first and second capacitor banks 130, 140 connect to the Substation A substation bus 110A via the Substation A distribution lines 115A and 115B. Similarly, the third capacitor bank 150 should be assigned to and receive commands from the Substation B master controller 105B because the third capacitor bank 150 is connected to the Substation B substation bus 110B via the Substation B distribution line 117B. The fourth and fifth capacitor banks 160, 170 should receive commands from the Substation C master controller 105C because the fourth and fifth capacitor banks 160, 170 connect to the Substation C substation bus 110C via respective Substation C power distribution lines 119A and 119D.

However, the master controllers 105A, 105B and 105C actually control any capacitor bank which has its address included within a control list for the master controller (e.g., preferably, the addresses associated with the first and second capacitor banks 130, 140 should be listed within a control list in the memory of the Substation A master controller 105A). In order to switch a selected capacitor bank, the assigned master controller locates an assigned address of the selected capacitor bank within its control list. In one embodiment, the frequency channel to which the selected capacitor bank is tuned is contained in a location at the assigned address in the control list for the assigned master controller. Thus, the assigned master controller sends command signals to the selected capacitor bank over the frequency designated at the assigned address on the control list.

Figure 2:
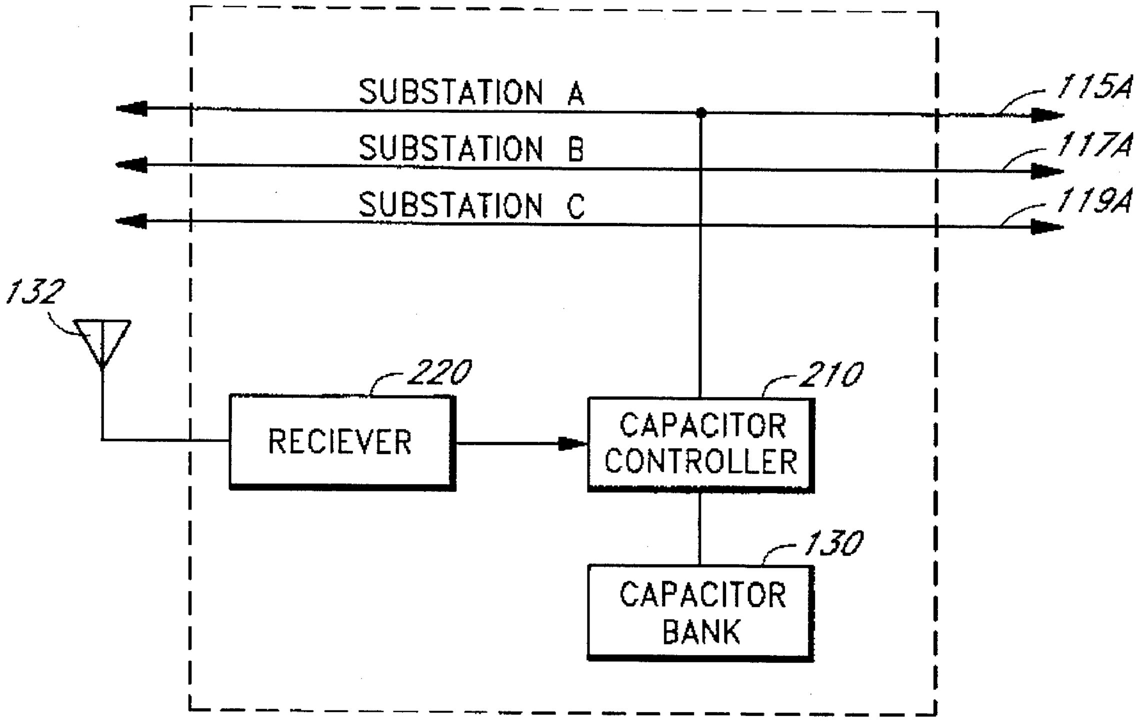
FIG. 2 is a block diagram which shows the basic control elements for the capacitor banks of FIG. 1.

FIG. 2 is a block diagram which details the main control elements for the first capacitor bank 130. It should be understood that the first capacitor bank 130 is exemplary, and a like control configuration may be found for the other capacitor banks 140–170 in the power distribution system. As depicted in FIG. 2, the first capacitor bank 130 couples to the Substation A power distribution line 115A (the power distribution line 115A connects to the Substation A 100A as depicted in FIG. 1) via a capacitor controller 210. The capacitor controller 210 may, for example, comprise a controllable relay or some other electronically controllable switching mechanism with a radio interface. Exemplary radio interfaces are available from Metricom Corporation. The capacitor controller 210, under control of the substation A master controller, couples the first capacitor bank 130 to the Substation A distribution line 115A. When the connection status of the first capacitor bank 130 is to be changed, the capacitor controller 210 is activated by a command from the associated master controller (in this case, the Substation A master controller 105A).

It should be understood that the number of substations, master controllers, and capacitor banks depicted in FIG. 1 is merely exemplary. Power distribution networks can have more or fewer of each element.

In the embodiment where the communication link between the Substation A master controller 105A and the first capacitor bank 130 is a radio communication link, the first capacitor bank 130 includes a receiver 220 which connects to the antenna 132. The receiver 220 decodes radio signals transmitted by the controlling master controller (e.g., in this case the Substation A master controller 105A) and converts these radio signals into control signals used to operate the capacitor controller 210.

During normal operation, the master controllers 105A–105C continuously monitor their respective substation busses 110A–110C and associated distribution lines 115, 117, 119. Each master controller 105A–105C typically monitors bus characteristics such as voltage. Preferably, each master controller 105A–105C also monitors individual distribution line characteristics such as VARs. Although the voltage on the substation bus is the same as the voltage on each distribution line coupled to the substation bus, the VARs for the individual distribution lines provide information about each distribution line.

On a substation bus level, when a master controller 105A–105C determines that unacceptable system distribution inefficiencies are occurring (via a decreased substation bus voltage), the master controller 105A–105C activates one or more of the capacitor banks 130–170 via its associated capacitor controller to compensate for inefficiencies in the substation system. For Example, if the Substation C detects a decreased voltage level on its substation bus 110C, the Substation C master controller 105C may activate either the fourth capacitor bank 160 or the fifth capacitor bank 170. Both the fourth and fifth capacitor banks 160, 170 under the control of the Substation C master controller 105C in the example of FIG. 1.

However, because in the example, the fourth capacitor bank 160 is connected to a first Substation C distribution line 119A and the fifth capacitor bank 170 is connected to a second Substation C distribution line 119D, if the inefficiency (e.g., the inductive load) is actually present on the first Substation C distribution line 119A, and the Substation C master controller 105C switches in the fifth capacitor bank 170, adding the capacitor is less advantageous than switching in the fourth capacitor bank 160 that is directly coupled to a the first Substation C distribution line 119A experiencing the inefficient load characteristic.

Accordingly, the master controllers 105A–105C can also compensate for inductive loads on a distribution line basis. By monitoring the VARs for the respective individual distribution line, the master controllers 105A–105C can identify the particular distribution line which has become inefficient. For instance, if the load on the first Substation A distribution line 115A becomes too inductive, the Substation A master controller 105A connects the capacitor bank 130 into the first Substation A distribution line 115A in order to counter the inductive load detected on the first Substation A distribution line 115A. On the other hand, if the power inefficiencies are due to too great of a capacitance on the first Substation A distribution line 115A, the Substation A master controller 105A disconnects the first capacitor bank 130 from the first Substation A distribution line 115A. Thus, by means of the plurality of capacitor banks 130–170 under control of the various master controllers 105A–105C, increased efficiency may be maintained on the power distribution lines 115, 117, 119 via a feedback control and communication loop.

The above system and method of compensating for inductive loads is dependable and efficient if the appropriate capacitor banks remain under the control of the master controllers having control over the distribution lines associated with the capacitor banks. However, as indicated above, each of the capacitor banks 130–170 are often reconfigured day-by-day to meet the needs of changing power consumption along the power distribution lines 115, 117, 119. For example, a line-man may reconfigure the first capacitor bank 130 such that it is connected to a different Substation A distribution line 115B. Thus, on one day, the first capacitor bank 130 was configured to connect to the first Substation A power distribution line 115A, while the on next day, the first capacitor bank 130 is connected to a different Substation A power distribution line 115B. Alternatively, the first capacitor bank 130 may be configured to connect to on of the Substation B distribution lines 117.

When the first capacitor bank 130 is reconfigured to connect to another power distribution line, the first capacitor bank 130 is no longer a part of distribution line as configured with the Substation A master controller 105A. The first capacitor bank 130 may not be connected to any distribution line under control of the Substation A master controller 105A. Thus, activation of the capacitor bank 130 by the Substation A master controller 105A causes a change on the wrong distribution line (controlled by the master controller 105A or a different master controller). In fact, such activation of the capacitor bank 130 may interfere with the efficiency of new distribution line to which the capacitor bank 130 is connected. Thus, it is important that the newly configured capacitor bank be reassigned to the master controller (or to the new distribution line for the same master controller) which controls the distribution line to which the capacitor bank 130 is connected. However, the line-man may fail to report the change. Capacitors which have been reconfigured without a report of this change are lost capacitors.

Figure 3:
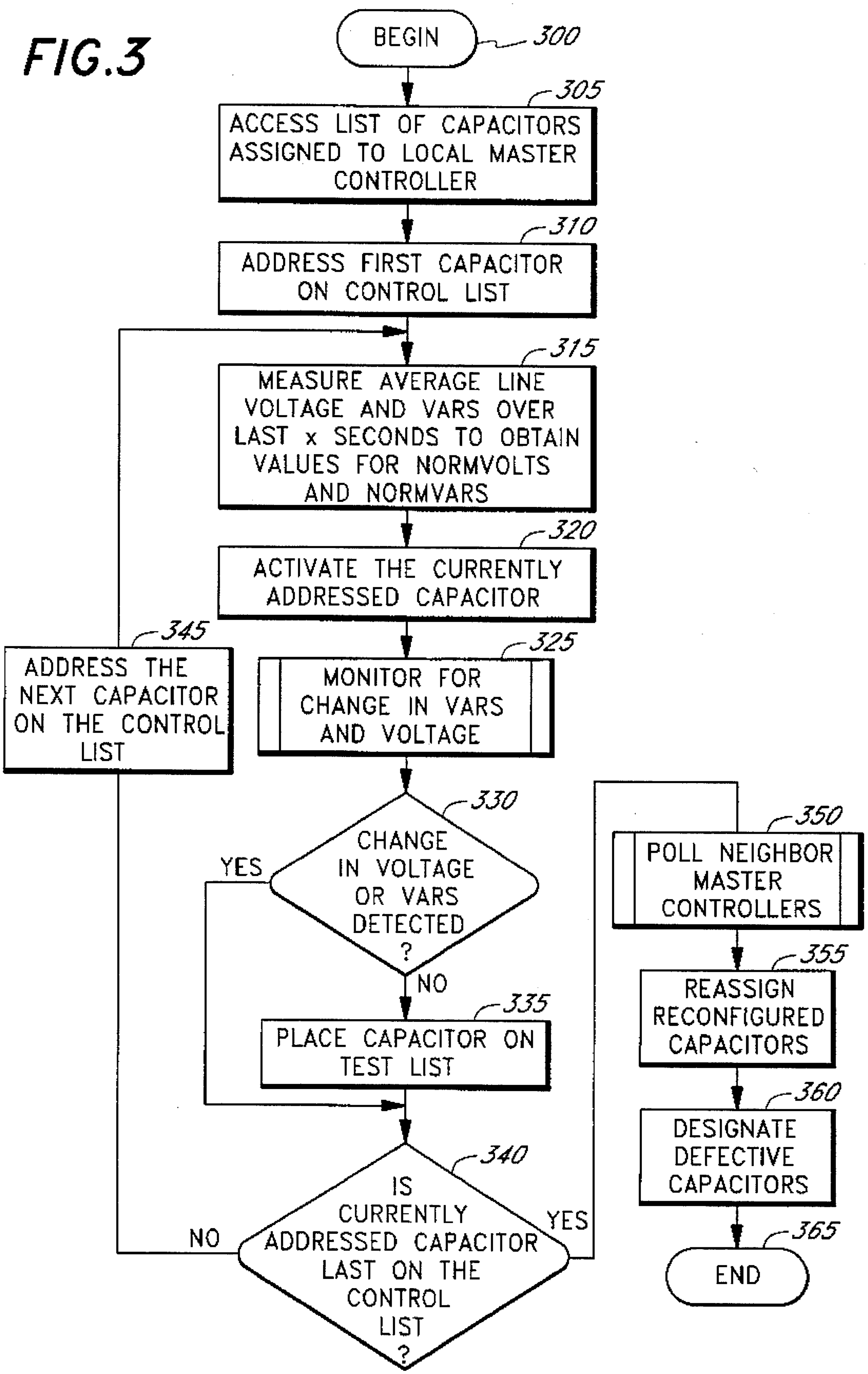
FIG. 3 is a flow chart which specifies the general method employed by the present invention to locate lost and dysfunctional capacitors.

The flow chart of FIG. 3 details the overall method by which reallocation of lost capacitors may be accomplished automatically. The method relies upon the understanding that when a functional capacitor of sufficient size is connected to a power distribution line, a detectable change in the voltage level and/or the VARs (volt amperes reactive) level on the associated distribution line is observed.

Generally, the method requires that a first master controller successively change the connection status of each of the switched capacitors under the control of that first master controller while the first master controller and neighboring (i.e., electronically adjacent) master controllers continuously monitor their respective substation busses and distribution lines for changes in voltage and/or VARs.

The first master controller keeps track of those capacitors which produce little or no change on the assigned distribution line, and little or not change on any other distribution line under control of the first master controller, by including these capacitors in a test list. If the first master controller detects a change on one of its own distribution lines other than the assigned distribution line, the first master controller reassigns the capacitor to the new distribution line.

For the capacitors that are on the test list, the first master controller polls the neighboring master controllers to determine if a change was detected on distribution lines of any of the neighboring controllers when the connection status of each capacitor on the test list was changed. If a change was observed in a neighboring master controller's distribution line, then the associated capacitor is reassigned to the control of the neighboring master controller automatically. Neighboring controllers can communicate over the radio interfaces 120A, 120B, 120C or over other communications systems.

Those capacitors for which no change is observed by any master controller are designated as dysfunctional. It should be noted that in present power distribution networks, a given switched capacitor is only reconfigured to the distribution line of a neighboring substation and its associated master controller. Thus, a master controller need only poll the electronically neighboring master controllers to determine the location of a lost capacitor.

FIG. 3 is a flowchart which more specifically represents the method employed in accordance with the teachings of the present invention to locate lost or defective capacitors. Preferably, this method is executed during times when distribution line loads are relatively constant, such as late at night. When the distribution line dynamics are minimal the re-allocation of lost capacitors is more accurate. For convenience, the method is described with reference to the Substation A master controller 105A as the first master controller.

First, all the initialization and self-test functions necessary to support the method of the present invention are performed, as represented in a begin block 300. The Substation A master controller 105A then accesses its control list of capacitor banks that are currently assigned to the power distribution lines 115 under the control of the Substation A master controller 105A, as represented in an activity block 305. This control list includes a list of addresses, wherein each address is associated with one of the capacitor banks in the power distribution network (e.g., the capacitor banks 130–170). In one advantageous embodiment, each address designates a memory location within the master controller 105A which stores a value representative of the frequency channel over which the transmitter 120 communicates with the addressed capacitor bank. As depicted in FIG. 1, the control list for the Substation A master controller 105A should include the first capacitor bank 130 and the second capacitor bank 140.

Once the Substation A master controller 105A accesses its control list, the capacitor controller for first capacitor bank 130 on the control list is addressed, as indicated by an activity block 310. However, before changing the status of the first capacitor bank 130 on the control list, the Substation A master controller 105A measures the average voltage on the substation bus 110A and voltage and/or VARs on the associated distribution lines 115 over several seconds (e.g., 10 seconds in one embodiment) to obtain values for a variable NORMVOLTS (average voltage on the substation bus which equals the average line voltage) and a plurality of variables NORMVARS (average VARs for each distribution line) respectively, as represented in an activity block 315.

Once the average line voltage and VARs have been measured and recorded within, (activity block 315), the currently addressed capacitor controller (e.g., the capacitor controller 210) is activated by command signals transmitted from the Substation A transmitter 120A to the receiver 220 for the addressed capacitor controller 210 for the first capacitor bank 130, as represented in an activity block 320.

To activate the currently addressed capacitor controller 210, the Substation A master controller 105A commands the addressed capacitor controller 210 to change the connection status of the first capacitor bank 130. That is, if the first capacitor bank 130 is connected to the first Substation A distribution line 115A, then activation of the addressed capacitor controller 210 by the Substation A master controller 105A causes the capacitor bank to be disconnected (i.e., the capacitor controller 210 constitutes an open circuit). If the capacitor bank 130 is initially disconnected from the Substation A power distribution line 115A, then activation of the capacitor controller 210 causes the capacitor bank 130 to be connected to the first Substation A power distribution line 115A.

As briefly described above, a change in the connection status of the first capacitor bank 130 results in an observable change in the voltage level on the substation bus 110A and all associated distribution lines 115 and an observable change in the VARs and voltage levels of the associated distribution line 115A, as long as the first capacitor bank 130 is configured, as expected, in the assigned distribution line 115A. Thus, each time a switched capacitor in the same distribution line as its associated master controller is switched, the VARs and voltage level on the substation bus and associated distribution line measured by the master controller change. By monitoring the voltage level on the substation power bus 110A and the VARs and/or voltage on the respective power distribution lines 115, the Substation A master controller 105A determines if a capacitor on its control list is in fact configured in the distribution lines monitored and controlled by the master controller 105A.

Monitoring of the substation bus 110A and associated distribution lines 115 for a change of voltage and/or VARs, respectively, is performed by the first master controller 105A, as indicated in a submethod block 325. A more detailed description of the operation represented within the submethod block 325 is provided below with reference to FIG. 4.

Next, a test is performed to determine whether a change in the voltage and/or VARs level has been detected by the Substation A master controller 105A, as indicated in a decision block 330. If a change is not detected in either the voltage or the VARs, the address of the currently addressed capacitor is placed on a test list, as indicated in an activity block 335. The test list is a compilation of all those capacitors on the control list which do not cause a change in voltage and/or VARs as detected by the Substation A master controller 105A on its associated substation power bus 110A or any of its associated distribution lines 115. Thus, these capacitors are either lost capacitors or defective capacitors.

If a change in the voltage and/or VARs was detected for the proper distribution line (decision block 330), then the capacitor is not defective and is correctly assigned (not lost). If the Substation A master controller 105A detects a VARs change on a distribution line under its control other than the first distribution line 115A (for the present example), the Substation A master controller 105A reassigns the first capacitor bank 130 to the proper distribution line associated with the Substation A master controller 105A, but still maintains control of the first capacitor bank 130.

Next, a determination is made whether the currently addressed capacitor is the last address on the control list, as represented in a decision block 340. If the currently addressed capacitor is not the last address on the control list, the next capacitor on the control list is addressed by the Substation A master controller 105A, as represented in an activity block 345. The process repeats, and the average line voltage and VARs over the last several seconds are again measured to obtain new values for NORMVOLTS and NORMVARS (activity block 315). This cycle is subsequently repeated until all of the addresses corresponding to capacitor banks on the control list for the Substation A master controller 105A have been accessed.

Once all the capacitors on the control list have been tested, each of the neighboring master controllers 105B, 105C is polled by the Substation A master controller 105A, as represented in a submethod block 350. In this polling submethod, described in greater detail below with reference to FIG. 5, the Substation A master controller 105A interrogates all the neighboring master controllers (e.g., the master controllers 105B, 105C in the embodiment depicted in FIG. 1) to determine if these master controllers detected any significant change in voltage and/or VARs at the time when the capacitors on the test list (e.g., the lost capacitors) were activated by the Substation A master controller 105A.

If a first neighboring master controller detected a change on a first neighboring distribution line at the time a first capacitor on the test list was switched, that capacitor is identified as having been reconfigured to the first neighboring distribution line. Accordingly, the first capacitor on the test list is reassigned to the first neighboring master controller.

Each capacitor that is identified as reconfigured to a distribution line for a neighboring master controller is reassigned to that master controller with reference to the appropriate distribution line, as represented in an activity block 355. Capacitors on the test list which are not identified as being reconfigured to any of the neighboring master controllers are designated as defective capacitors, as represented in an activity block 360. The method subsequently is terminated within an end block 365.

Figure 4:
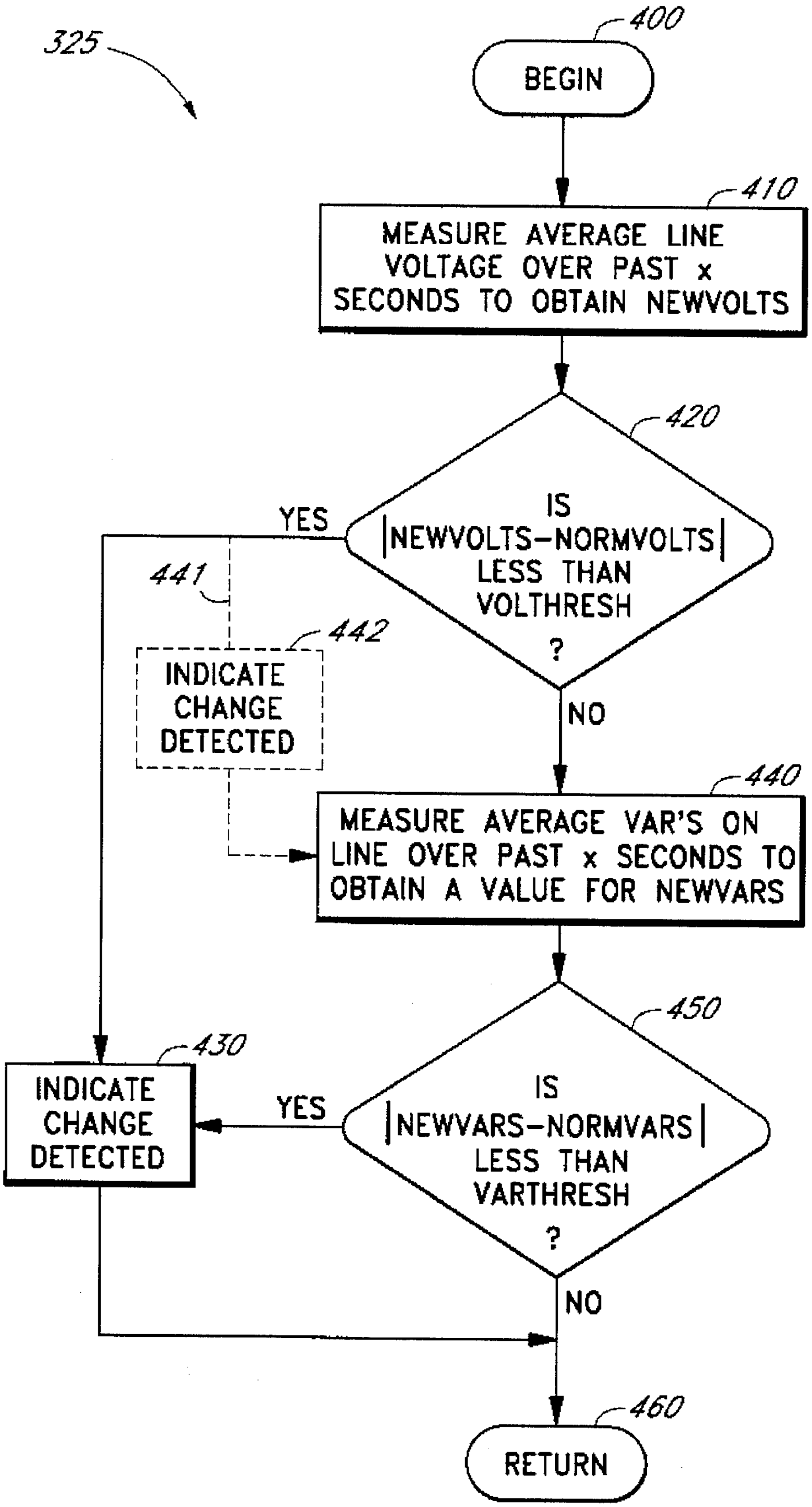
FIG. 4 is a flow chart which details a submethod employed within the overall method represented in FIG. 3 to monitor for changes in VARs and voltage on distribution lines.

FIG. 4 depicts a flowchart which represents the method employed within the submethod block 325 of the flowchart depicted in FIG. 3. The submethod starts in a begin block 400. The Substation A master controller 105A measures the average line voltage over the immediately passed several (e.g., 10) seconds to obtain a value of a variable NEWVOLTS, as represented in an activity block 410. Because the voltage of all distribution lines connected to the same substation bus will be equal, the voltage measurement can be made on the Substation A substation bus 110A, or on any one of the Substation A distribution lines 115.

The average line voltage may, for example, be obtained by an averaging of digital samples collected within the monitoring period. To increase reliability of measurements and to avoid deleterious effects due to power transients, etc., more than one measurement can be taken. That is, the same capacitor can be tested several times to insure that a more accurate decision is made. Next, a test is performed to determine if the absolute value of NEWVOLTS–NORMVOLTS is less than a voltage threshold value, VOLTTHRESH, as represented in an activity block 420.

The value of the variable VOLTTHRESH may be determined by a plurality of different methods. For example, the value of the variable VOLTTHRESH may be determined by taking into account the value of the currently tested capacitor. If the absolute value of NEWVOLTS–NORMVOLTS is not less then VOLTTHRESH, then this indicates that a significant voltage change has been produced by activation of the currently tested capacitor. The Substation A master controller 105A indicates the change detected, as represented in the activity block 430. If, however, the absolute value of NEWVOLTS–NORMVOLTS is less than the value of VOLTTHRESH, this indicates that no significant voltage change has been detected upon activation of the currently tested capacitor. In this case, the Substation A master controller 105A measures the average VARs for each of the Substation A distribution lines 115 coupled to the Substation A substation bus 110A over the past several seconds to obtain a value for a variable NEWVARS (for each distribution line), as represented in an activity block 440.

It should be understood, that in order to isolate the individual distribution line with which a switched capacitor is associated, the VARs level for each distribution line is monitored. Accordingly, in the embodiment where identification of the individual distribution line associated with a switched capacitor is desired, the VARs measurement is made even when a significant change in the voltage is detected on the substation bus. This is represented by the alternative path 441 depicted in dashed lines in the flowchart of FIG. 4. In the alternative path 441, an activity block 442 represents the indication of the detected voltage change. The VARs measurement then proceeds, as represented in the activity block 440 (to identify the associated distribution line).

Next, a determination is made whether the absolute value of NEWVARS–NORMVARS is less than a variable VARTHRESH, as represented in a decision block 450. The value of the variable VARTHRESH may also be calculated based upon the value of the currently tested capacitor. If the absolute value of NEWVARS–NORMVARS is not less than the value of the variable VARTHRESH, then this indicates that a significant change in the VARs on one of the Substation A distribution lines 115 has occurred upon connection or disconnection of the currently tested capacitor. In this case, the Substation A master controller 105A indicates the change detected, and the associated one of the distribution lines 115, as represented in the activity block 430.

However, if the absolute value of NEWVARS–NORMVARS is less than the value of the variable VARTHRESH, this indicates that no significant change has been detected either in the voltage or in the VARs. Control subsequently passes from the activity block 430 or from the decision block 450 to a return block 460, and control returns to the overall method depicted in FIG. 3. That is, control passes to the decision block 330 to determine if a change in the voltage and/or VAR level has been detected.

Figure 5:
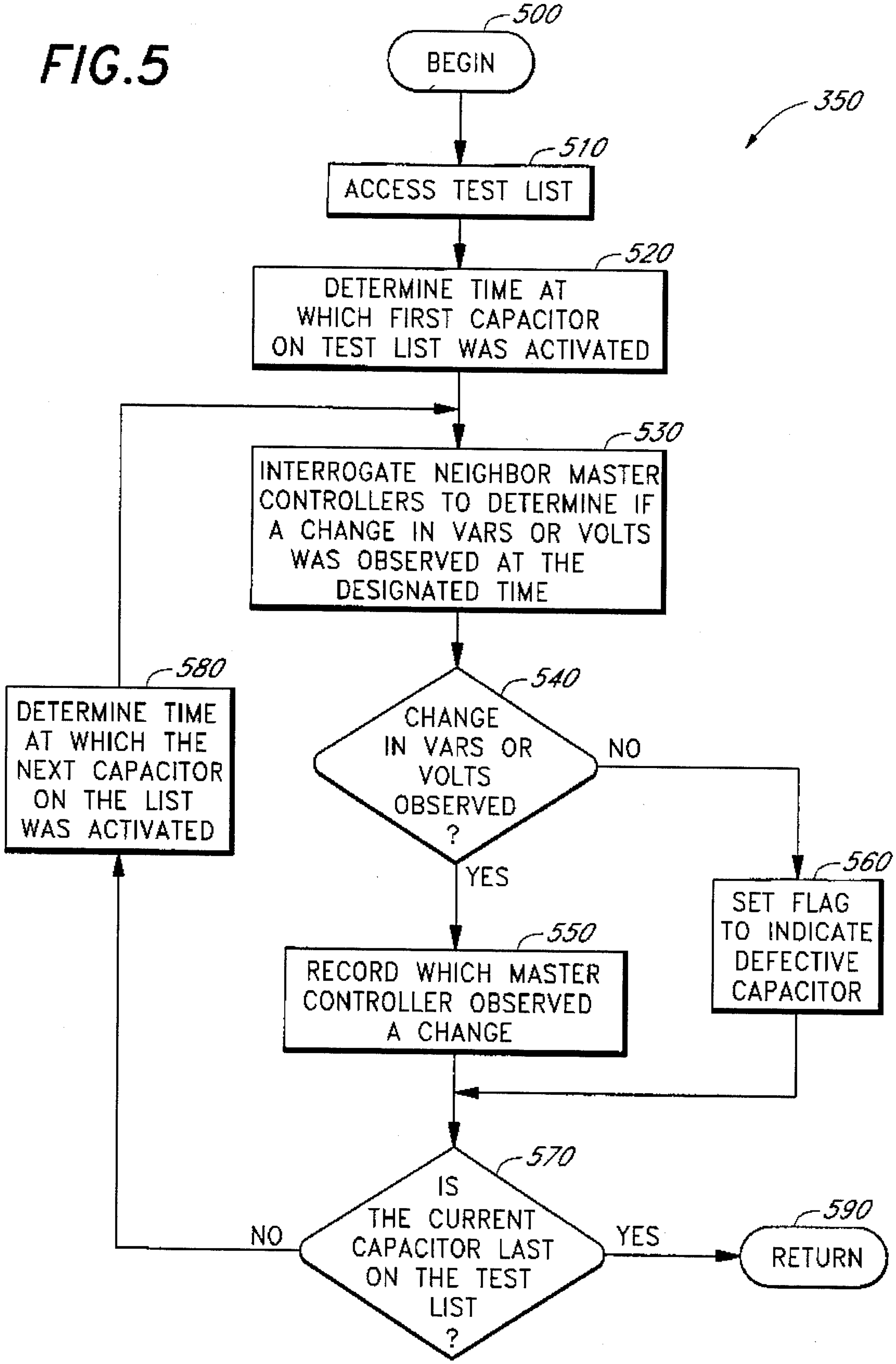
FIG. 5 is a flow chart which details a submethod of polling neighboring master controllers.

FIG. 5 is a more detailed flowchart of the submethod employed in accordance with the present invention to poll the neighboring master controllers (e.g., the master controllers 105B, 105C in the present example). The method starts in a begin block 500. First, the test list established in the activity block 335 (FIG. 3) is accessed by the Substation A master controller 105A, as represented in an activity block 510. Next, the Substation A master controller 105A determines the time at which the first capacitor on the test list was activated (i.e. the list of lost or defective capacitors), as represented in an activity block 520. The Substation A master controller 105A successively interrogates each of the neighboring master controllers to determine if a change in voltage and/or VARs was observed at the time at which the capacitor on the test list was activated, as represented in an activity block 530.

In order for this process to function, each of the master controllers 105A–105C continuously monitors its respective substation power bus 110A–110C and associated distribution lines 115, 117, 119, and notes any significant changes in distribution line characteristics such as voltage and/or VARs. Each time a significant change is detected in any of these parameters, a time stamp is stored in memory which designates the time and magnitude of the change (and, in one embodiment, the associated distribution line). Thus, each master controller 105A–105C may interrogate its neighbor master controllers to determine if significant change in the voltage level and/or the VARs level has occurred at a given time or within a given time interval.

Next, a test is performed to determine if the change in voltage and/or VARs was observed at the designated time at which the capacitor on the test list was activated, as represented by a decision block 540. If one of the neighbor master controllers 105B, 105C observed a significant change in voltage and/or VARs at the activation time of the capacitor on the test list, this indicates that the capacitor on the test list was reconfigured so that it is now part of one of the distribution lines controlled by the master controller which observes the change in voltage and/or VARs. In this case, the Substation A master controller 105A records which of the neighboring master controllers 105B, 105C observed a change, as represented in an activity block 550.

If no change in voltage and/or VARs level is observed by any of the neighboring master controllers 105B, 105C (decision block 540), the tested capacitor has had no effect on any of the neighboring power distribution lines 117, 119, therefore indicating that this capacitor is defective or is not connected in any distribution line. Therefore, the Substation A master controller 105A sets a flag to indicate that the tested capacitor is defective as represented in an activity block 560.

Control passes from the activity block 560 or the activity block 550 to a decision block 570, and a determination is made if the current capacitor is the last capacitor on the test list. If the current capacitor is not the last capacitor on the test list, then the master Substation A master controller 105A determines the time at which the next capacitor on the test list was activated, as represented in an activity block 580. The process repeats itself until the Substation A master controller 105A has interrogated all of the neighboring master controllers concerning each of the lost capacitors on its test list. Once the polling process has been completed for all the capacitors on the test list, control passes from the decision block 570 to a return block 590 which returns control of the method to the main method. Control returns to the activity block 355 (FIG. 1).

After the first master controller (the Substation A master controller 105A in the above example) has identified all lost capacitors in its control list, each neighboring master controller, in sequence, performs a similar method to identify, reassign, or mark as defective, all capacitors within its control list.

The present invention may be embodied in several forms with many obvious modifications without departing from its spirit or essence. Thus, the above description should be considered as merely illustrative and not restrictive. For example, a circuit other than a microprocessor could be used to detect changes in the VARs and voltage level of the substation power busses 110A–110C. Furthermore, some combination of voltage level and VARs level could be used as a criterion to determine if a significant change has occurred in the state of the substation power busses 110A–110C. Additionally, the capacitor controllers could be distributed intelligence devices that communicate with other capacitor controllers and with master controllers to perform the method. Thus, the scope of the present invention is defined in light of the appended claims.

I claim:

1. A method of maintaining a control list of load regulation capacitors within a power distribution network comprising the steps of:

(a) generating a control list of load regulation capacitors which are associated with, and under the control of, a first master controller for a first power distribution subsystem in the power distribution network, said control list identifying at least one capacitor;

(b) changing the connection status of said accessed capacitor;

(c) monitoring the state of a distribution line within said first power distribution subsystem for a predetermined change in the state of said distribution line when the connection status of said capacitor is changed;

(d) indicating if the change in the connection status of said capacitor does not produce said predetermined change in the state of said distribution line;

(e) repeating steps (b), (c) and (d) for each capacitor on said control list; and (h) removing the indicated capacitors from the control list for said first master controller.

2. A method as defined in claim 1, further comprising the steps of:

identifying which of a plurality of other power distribution subsystems the indicated capacitors are associated with; and reassigning control of the indicated capacitors to at least one second master controller for the identified other distribution subsystems.

3. A method of managing a control list of load regulation capacitors within a power distribution network having a plurality of power distribution subsystem, the method comprising the steps of:

generating a control list of load regulation capacitors which are associated with, and under the control of, a first master controller for a first power distribution subsystem;

accessing each of said load distribution capacitors on said control list and changing the connection status of each of said accessed capacitors while monitoring the state of a first distribution line within said first power distribution subsystem for a predetermined change in the state of said first distribution line when the connection status of each of said capacitors is changed;

recording a capacitor identifier in a test list for any capacitor if the change in the connection status for said any capacitor does not produce said predetermined change in the state of said first distribution line; and removing the recorded capacitors from the control list.

4. The method as defined in claim 3, further comprising the steps of:

polling at least one second master controller for at least one second power distribution subsystem to determine if the change in connection status of any capacitor on said test list caused a change in state of a second distribution line connected to said at least one second power distribution subsystem; and reassigning control to a second master controller of any capacitor from said test list for which the change in connection status resulted in a change in the state of the second distribution line connected to said at least one second power distribution subsystem.

5. A system for managing the control of load regulation capacitors in a power distribution system comprising:

a plurality of power distribution subsystems, each subsystem comprising:

a master controller;

a subsystem power bus which connects to said master controller, said master controller configured to monitor said subsystem power bus by said master controller; and a plurality of power distribution lines which are electrically connected with said subsystem power bus;

a plurality of switched capacitors, each of said capacitors connectable to one of said plurality of power distribution lines for one of said power distribution subsystems, each of said capacitors controllable by a master controller within one said power distribution subsystems via a communication link;

means for monitoring at least one of said plurality of power distribution lines for a predetermined change in the state of said at least one power distribution line upon a change of connection status of one of said switched capacitors, said switched capacitor under the control of a first one of said master controllers;

an indicator responsive to the lack of a change in the state of said power distribution line when the connection status of said switched capacitor is changed; and a control unit responsive to said indicator and configured to identify when a second one of said master controllers detected a change in the state of an associated second power distribution line and to indicate that said capacitor is associated with said second power distribution line.

* * * * *